United States Patent [19]

Hatanaka

[11] Patent Number: 4,782,806
[45] Date of Patent: Nov. 8, 1988

[54] FUEL INJECTION SYSTEM AND METHOD FOR A PREMIXTURE TYPE INTERNAL COMBUSTION ENGINE

[75] Inventor: Kenji Hatanaka, Fujisawa, Japan

[73] Assignee: Nissan Motor Company, Limited, Kanagawa, Japan

[21] Appl. No.: 63,231

[22] Filed: Jun. 17, 1987

[30] Foreign Application Priority Data

Jun. 17, 1986 [JP] Japan .................. 61-141038

[51] Int. Cl.$^4$ .................. F02D 41/62; F02M 51/00
[52] U.S. Cl. .................. 123/486; 123/478; 123/52 MV
[58] Field of Search .......... 123/478, 480, 486, 438, 123/52 M, 52 MV, 188 M

[56] References Cited

U.S. PATENT DOCUMENTS

| | | | |
|---|---|---|---|
| 4,387,429 | 6/1983 | Yamauchi et al. | 123/478 X |
| 4,478,190 | 10/1984 | Kawai | 123/478 |
| 4,485,791 | 12/1984 | Sugo et al. | 123/478 |
| 4,491,143 | 1/1985 | Yasuhara | 137/172 |
| 4,495,924 | 1/1985 | Ueno et al. | 123/478 |
| 4,528,956 | 7/1985 | Ogata et al. | 123/478 X |
| 4,562,817 | 1/1986 | Ito | 123/478 |
| 4,567,868 | 2/1986 | Yasuhara | 123/300 |

Primary Examiner—Willis R. Wolfe
Attorney, Agent, or Firm—Lowe, Price, LeBlanc, Becker & Shur

[57] ABSTRACT

A fuel injection system and method for injecting fuel into a chamber in an air intake manifold which is connected to plurality of engine cylinders by a plurality of branch passages. The fuel injection system controls separately an amount of fuel injected from an injector to each engine cylinder with configurations of the respective branch passages taken into account. That is to say, in the fuel injection system, at least one fuel injector is disposed so as to inject fuel into the chamber, timing of suction stroke of each engine cylinder is determined, and the amount of fuel supplied to each cylinder is set on the basis of the dimensions of the branch passage from the position of the fuel injector to a corresponding cylinder, and the amount of fuel injected through the fuel injector for each cylinder is calculated on the basis of the amount of fuel to be actually distributed to each cylinder. The fuel injector is actuated to inject fuel in the suction stroke of each cylinder, the amount of fuel injected being calculated on the basis of amount of fuel to be actually distributed to each cylinder.

10 Claims, 4 Drawing Sheets

SIX CYLINDER ENGINE

1, 3, 5 CYL.    #2, 4, 6 CYL.

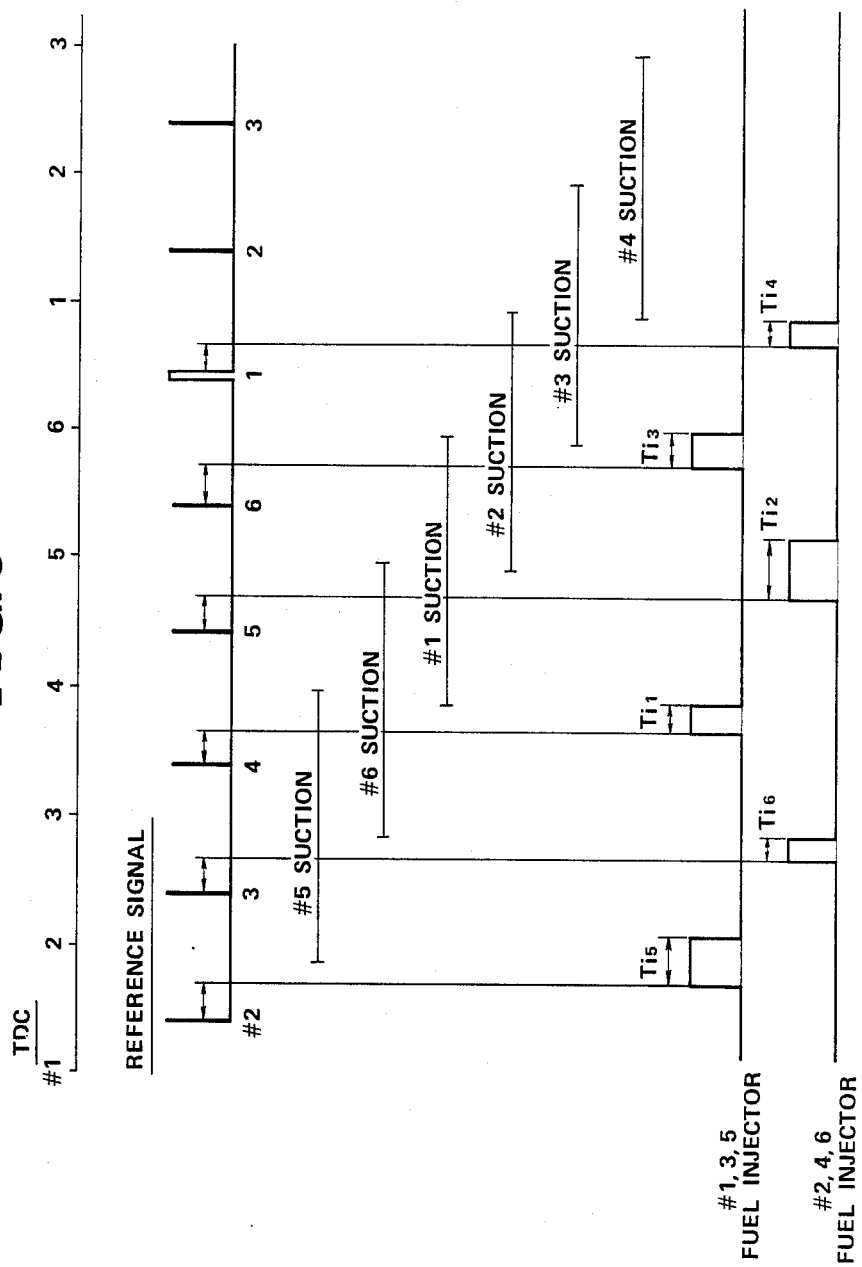

FUEL INJECTION SYSTEM AND METHOD FOR A PREMIXTURE TYPE INTERNAL COMBUSTION ENGINE

BACKGROUND OF THE INVENTION

The present invention relates to a system and method for injecting fuel into a chamber of an air intake manifold having a plurality of branch passages to intake ports of cylinders of an internal combustion engine.

In a premixture type gasoline engine, at least one fuel injector is disposed so as to inject fuel into a chamber of an air intake manifold of the engine in order to achieve a predetermined air-fuel mixture ratio and supply rate for the air fuel mixture to be supplied to the engine according to engine load. The chamber is connected to a plurality of engine cylinders via a plurality of branch passages.

Such conventional fuel injection systems as described above are exemplified by a Japanese Publication "Toyota Technology" published on June, 1984 in pages 55 to 61.

In the above-identified Japanese document, two fuel injectors are disposed within a chamber defining a junction of a plurality of branch passages connected to the respective engine cylinders to inject fuel for first through sixth engine cylinders. It is noted that two fuel injectors are disposed upstream of a throttle valve and a heater is disposed downstream of the throttle valve to promote atomization of fuel injected through the fuel injectors. An intermediate position of the intake manifold downstream of the heater forms branches into a plurality of passages, each communicating with an intake port of a corresponding cylinder.

The fuel injectors inject fuel supplied from a fuel supply apparatus in synchronization with a suction stroke of each cylinder so as to provide the predetermined air-fuel mixture ratio. In the case disclosed in the above-identified Japanese Publication, the amount of fuel to be injected by the injectors is calculated by means of a control unit according to engine load (as determined by intake air quantity). The calculation operation is repeated in synchronization with engine revolution. The same amount of fuel, which is derived in one calculation operation, is injected by the injectors to each of the engine cylinders in the corresponding engine cycle. The injected fuel, at this time, flows from the junction through each of the branch passages to the respective cylinders in sequence. The timing of the injection pulses is calculated and controlled to correspond to the suction strokes of the respective cylinders.

In the conventional fuel injection system disclosed in the above-identified Japanese document, a time it takes for the injected fuel from the injectors to arrive at the respective cylinders is different because the branch passages are not of equal length and the air stream in the intake manifold has an influence on the arrival times of the injected fuel to the respective cylinders. Therefore, when a uniform amount of fuel is injected via the fuel injectors in the suction stroke of each cylinder, the respective amounts of fuel actually sucked into the respective cylinders are unequal.

Since distribution of fuel into the respective cylinders is also affected by the engine revolution speed and engine load (e.g., intake air quantity), consequently a rich air-fuel mixture ratio for some cylinders and a thin air-fuel mixture ratio for other cylinders are found. Therefore, fuel economy becomes reduced, torque output of the engine becomes varied due to unstable combustion, and engine vibration due to unequal torque output between the individual cylinders is increased. Furthermore unstable combustion characteristics cause emission control problems.

SUMMARY OF THE INVENTION

It is an object of the present invention to provide a system and method for injecting fuel to engine cylinders of a premixture type internal combustion engine which achieve fuel economy, stable torque output, and reduction of engine vibrations.

It is another object of the present invention to provide the system and method for injecting fuel to the respective engine cylinders which achieve an equal amount of injected fuel from at least one fuel injector into each engine cylinder.

It is still another object of the present invention to provide the system and method for injecting fuel to the respective engine cylinders which achieve the equal amount of fuel supplied to each engine cylinder over all engine operating conditions.

The above described objects can be achieved by providing a fuel supply system for an internal combustion engine, comprising: (a) a chamber connected to intake air ports of engine cylinders via a plurality of branch passages; (b) a device for supplying fuel into the chamber at a controllable rate and timing; (c) first means for determining the timing of a suction stroke of each engine cylinder; and (d) second means for controlling separately an amount of fuel supplied to each engine cylinder in the suction stroke determined by the first means from the device.

The above-described objects can also be achieved by providing a fuel injection system for an internal combustion engine, comprising: (a) a chamber connected to a plurality of intake air ports by a plurality of branch passages having mutually unequal dimensions; (b) at least one fuel injector for injecting a controllable amount of fuel into the chamber at a timing corresponding to a suction stroke of an engine cylinder in response to an injection pulse signal inputted thereto; (c) first means for determining the timing of the suction stroke of each of the engine cylinders; (d) second means for detecting engine operating conditions; (e) third means for calculating a value representative of a basically required amount of fuel to be sucked into each of the individual engine cylinders during the suction stroke thereof on the basis of values derived by the first and second means; (f) fourth means for calculating a correction amount by which the value calculated by the third means is corrected on the basis of the engine operating conditions derived by the second means and lengths from a position of the fuel injector to the respectively corresponding intake ports of the engine cylinders; (g) fifth means for calculating an actual value representative of a required amount of fuel to be actually sucked into each of the individual engine cylinders during the suction stroke therof on the basis of the values derived by the third and fourth means; and (h) sixth means for producing and outputting the injection pulse signal to the fuel injector at the timing derived by the first means, the pulsewidth thereof corresponding to the actual value calculated by the fifth means.

The above-described objects can also be achieved by providing a method for injecting fuel into a chamber connected to a plurality of piston cylinder intake ports by a plurality of branch passages having mutually unequal lengths of an internal combustion engine, comprising the steps of: (a) detecting and reading an engine load and engine revolution speed; (b) identifying one of the cylinders in a timing of suction stroke; (c) setting a rate of fuel distribution to each cylinder on the basis the detected and read engine load and engine revolution speed in the step (a) and each dimension of the branch passages from a position of the fuel injector to each cylinder including each branch passage and reading the rate of fuel distribution for the corresponding one of the cylinders in the suction stroke identified in the step (b); (d) calculating a fuel injection pulsewidth for each cylinder on the basis of the rate of fuel distribution to each cylinder and engine load and engine revolution speed detected and read in the step (a) and (e) actuating the fuel injector to inject fuel in each suction stroke of the respective cylinders identified in the step (b) on the basis of the fuel injection pulsewidth calculated in the step (d).

BRIEF DESCRIPTION OF THE DRAWINGS

FIG. 6 is a timing chart depicting characteristics of fuel injection of the fuel injection system shown in FIG. 3.

DETAILED DESCRIPTION OF THE PREFERRED EMBODIMENT

Reference will hereinafter be made to the drawings in order to facilitate understanding of the present invention.

Figure 1:
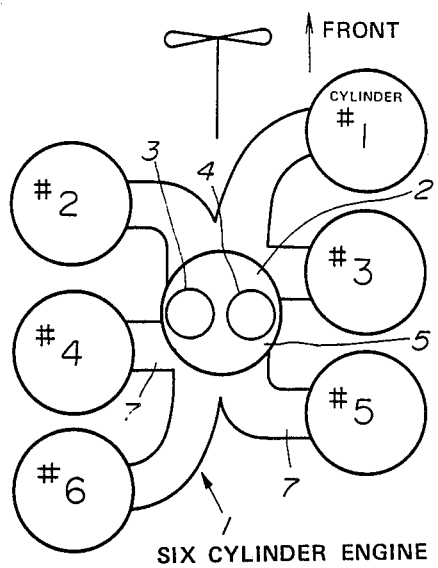
FIG. 1 is a schematic diagram of an air intake manifold including a plurality of branch passages connected to respective engine cylinders.
Figure 2:
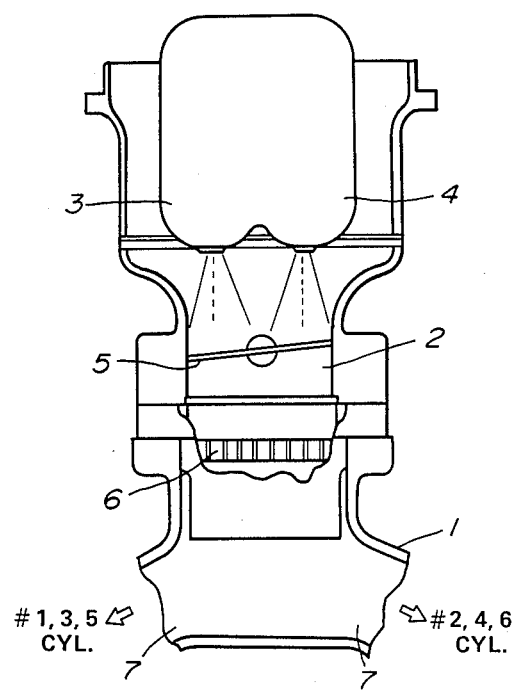
FIG. 2 is a longitudinally sectioned view of a chamber of the air intake manifold shown in FIG. 1.

First, FIGS. 1 and 2, show configurations of a six-cylinder premixture-type internal combustion engine.

As shown in FIG. 1, an intake manifold 1 defines a chamber 2 from which a plurality of branch passages 7 lead to the individual cylinders (first cylinder through sixth cylinder). Two fuel injectors 3, 4 are disposed upstream of the throttle valve 5 and a heater 6 is disposed downstream of the throttle valve 5 for promoting atomization of supplied fuel. The throttle valve 5 adjusts air flow rate in the intake manifold 1. The two fuel injectors 3, 4 inject fuel to be supplied to respective engine cylinders. The intake manifold 1 forms branch passages 7 downstream of the heater 6, respective ends of which are connected to air intake ports of the respective cylinders.

Next, FIG. 3 through 6 show a fuel injection system of a preferred embodiment according to the present invention.

Figure 3:
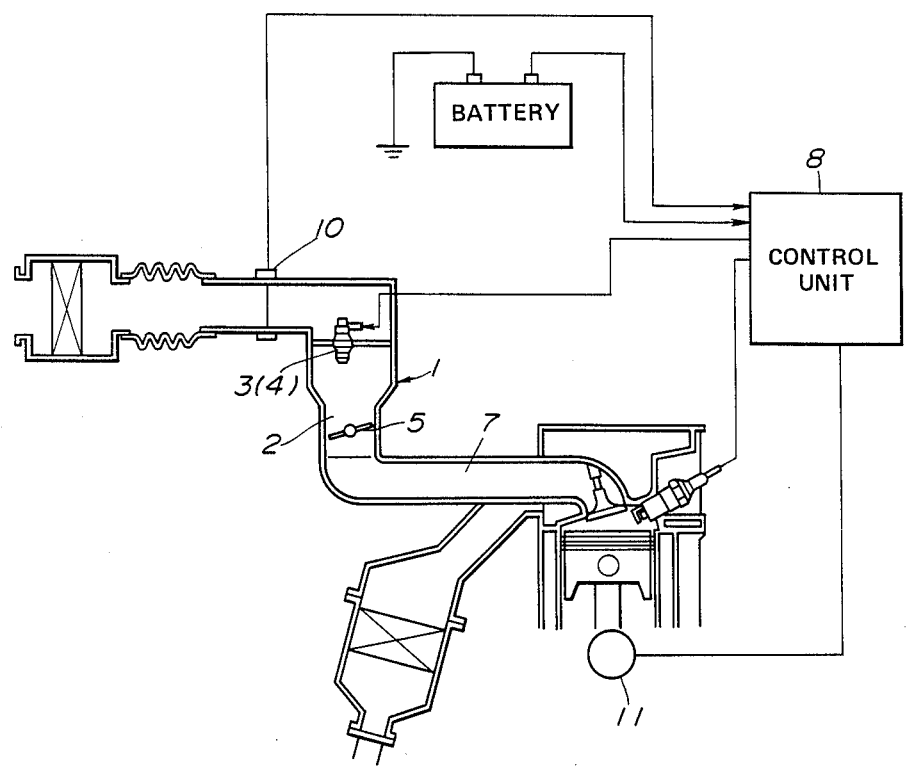
FIG. 3 is a circuit block diagram of a fuel injection system of a preferred embodiment according to the present invention.

In FIG. 3, the two injectors 3, 4 constituting a device for supplying fuel into the cylinders are disposed in the chamber 2 of the intake manifold 1 to inject fuel on the basis of an injection pulse signal derived from a control unit 8. The injected fuel is sucked into each cylinder via the branch passages 7 branched from the chamber 2.

The control unit 8 includes a microcomputer for calculating the amount of fuel to be supplied to the engine in accordance with engine load and engine revolution speed and for actuating either of the fuel injectors 3, 4 to inject fuel in synchronization with the suction stroke of each engine cylinder by the injection pulse signal. The microcomputer includes a CPU (Central Processing Unit), ROM (Read Only Memory), RAM (Random Access Memory), Input/Output Port, and so on.

The control unit 8 receives a signal from engine load detecting means such as an intake air quantity sensor 10 and a signal from engine revolution speed detecting means such as a crank angle sensor 11. The crank angle sensor 11 outputs a crank angle signal indicating a unit angle of crankshaft angular position, for a calculation of the engine revolution speed and a position reference signal for identifying positions of the respective cylinders.

Figure 5:
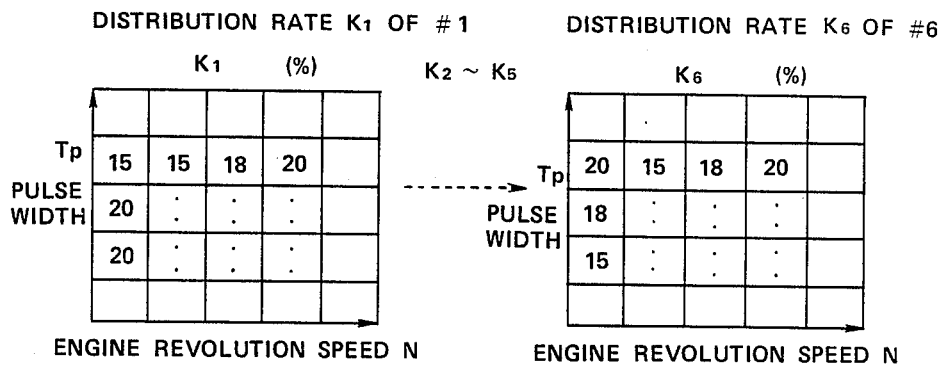
FIG. 5 is a chart depicting a lookup table of fuel distribution rates to the respective cylinders stored in a memory of the control unit of the fuel injection system shown in FIG. 3.

On the other hand, the ROM of the control unit 8 stores a series of look up tables such as those shown in FIG. 5 in which a distribution rate $Kn$ of fuel (a so called, correction coefficient for the amount of injected fuel) is allocated to each engine cylinder on the basis of the pulsewidth $Tp$, engine revolution speed $N$, and branch passage length. The distribution rate $Kn$ is set in such a way that the rate becomes large in conditions where the amount of injected fuel actually sucked into any of the cylinders tends to become disproportionately small and, conversely, the rate becomes small under conditions where the amount of injected fuel actually sucked into other cylinders tends to become disproportionately large, with the length of each branch passage 7 from the injectors 3, 4 to the corresponding intake air port of cylinder, inner volume of each branch passage, and influence of the inertia of the air stream flowing through the branch passages 7 taken into account.

It is noted that the deviation of fuel distribution to the respective cylinders also varies according to the engine revolution speed and engine load and the fuel distribution rate $Kn$ is, therefore, varied according to the engine revolution speed and the pulsewidth of the fuel injection pulse signal supplied to each fuel injector 3, 4.

The control unit 8 adjusts the amount of fuel injected at the time of the suction stroke of each cylinder for each calculation operation cycle on the basis of the mapped distribution rate $Kn$ ($n=1, 2, \ldots, 6$).

Figure 4:
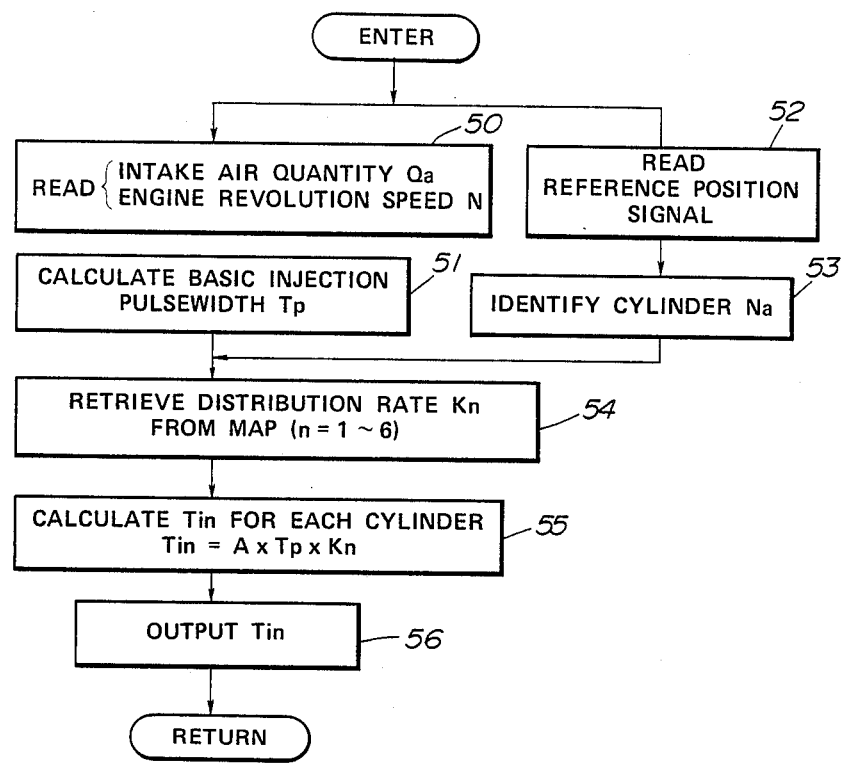
FIG. 4 is a processing flowchart of a control operation executed in a control unit of the fuel injection system shown in FIG. 3.

The calculation operation of the control unit 8 will be described below with reference to the flowchart shown in FIG. 4.

The control unit 8 reads the intake air quantity $Qa$ and engine revolution speed $N$ in a step 51 and calculates a basic fuel injection pulsewidth $Tp$ on the basis of the read values of the intake air quantity $Qa$ and engine revolution speed $N$ in a step 52.

On the other hand, the control unit 8 reads the reference position signal from the crank angle sensor 11 in a step 52 and identifies the cylinder which is presently in the suction stroke.

Next, the distribution rate $Kn$ for the identified cylinder is retrieved from the stored table shown in FIG. 5 on the basis of the read and calculated engine revolution speed $N$ and pulsewidth $Tp$ in a step 54.

The control unit 8 thereafter calculates other pulsewidths according to the other respective engine cylinders on the basis of the above-described $Tp$ and $Kn$ using such an equation as Tin=A (constant number)×Tp ×Kn (n=1, 2, ..., 6) and outputs the injection pulse signal to either of the injectors 3, 4 having the calculated pulsewidth Tin (Ti1, Ti3, and Ti5 for one of the fuel injectors and Ti2, Ti4, and Ti6 for the other fuel injector).

In an example shown in FIG. 6, since there is a tendency for the fuel supply for the fifth and second cylinders to become small relative to that of the other cylinders in a steady state, the pulsewidths of Ti5 and Ti2 during which the corresponding fuel injector injects fuel for the fifth and second cylinders are made wider than those Ti1, Ti3, Ti4, and Ti6 for the other cylinders.

Consequently, the fuel injection system of the preferred embodiment prevents a thinner air-fuel mixture ratio from occurring at the fifth and second cylinders and can distribute injected fuel evenly among the cylinders.

In this way, since the amount of injected fuel through the respective fuel injectors is adjusted for each of the cylinders on the basis of the fuel distribution rate Kn (correction coefficient) according to the dimensional construction of the branch passages connected to the respective cylinders, the engine can achieve stable output characteristics without divergence of fuel combustion characteristics between the cylinders.

As described hereinabove, since the system and method for injecting fuel into the chamber of the air intake manifold of an internal combustion engine adjust the amount of fuel injected to each engine cylinder for each calculation cycle on the basis of the distribution rate set with the times it takes for the injected fuel to actually arrive at the respective cylinders and deviation of amounts of fuel supply generated between the respective cylinders taken into account, the distribution of fuel among the cylinders becomes even. The arrival times are based on dimensions such as lengths (and volumes) of the respective branch passages from the chamber of the intake manifold to the respective engine cylinders. Consequently, divergence of the fuel combustion characteristics between the cylinders can be avoided so that fuel economy and improvement of the exhaust gas composition can be achieved. In addition, a reduction in engine vibrations caused by torque variations between the respective engine cylinders can be achieved thus reducing engine wear.

It will fully be appreciated by those skilled in the art that the foregoing description is made in terms of preferred embodiment and various changes and modifications may be made without departing from the scope of the present invention which is to be defined in the appended claims.

What is claimed is:

1. A fuel supply system for an internal combustion engine, comprising:
   (a) a chamber connected to intake air ports of engine cylinders via a plurality of branch passages;
   (b) a device for supplying fuel into the chamber at a controllable rate and timing;
   (c) first means for determining a timing of a suction stroke of each engine cylinder; and
   (d) second means for controlling an amount of fuel supplied from the device to each cylinder in the suction stroke determined by the first means according to dimensions of each branch passage connected to a corresponding cylinder so as to substantially equally distribute the actual amount of fuel sucked into the cylinders.

2. The system according to claim 1, wherein the device comprises at least one fuel injector located upstream of a throttle valve in the chamber.

3. A fuel supply system for an internal combustion engine, comprising:
   (a) a chamber connected to intake air ports of engine cylinders via a plurality of branch passages;
   (b) a device for supplying fuel into the chamber at a controllable rate and timing;
   (c) first means for determining a timing of a suction stroke of each engine cylinder; and
   (d) second means for separately controlling an amount of fuel supplied to each engine cylinder from the device in the suction stroke determined by the first means wherein the second means controls separately the amount of fuel supplied to each engine cylinder according to dimensions of substantially each branch passage connected to a corresponding engine cylinder.

4. A fuel injection system for an internal combustion engine, comprising:
   (a) a chamber connected to a plurality of intake air ports by a plurality of branch passages having mutually unequal dimensions;
   (b) at least one fuel injector for injecting a controllable amount of fuel into the chamber at a timing corresponding to a suction stroke of an engine cylinder in response to an injection pulse signal inputted thereto;
   (c) first means for determining the timing of the suction stroke of each of the engine cylinders;
   (d) second means for detecting engine operating conditions;
   (e) third means for calculating a value representative of a basically required amount of fuel to be sucked into each of the individual engine cylinders during the suction stroke thereof on the basis of values derived by the first and second means;
   (f) fourth means for calculating a correction amount by which the value calculated by the third means is corrected on the basis of the engine operating conditions derived by the second means and the lengths measured respectively between from a position of the fuel injector to the respective corresponding intake ports of the engine cylinders;
   (g) fifth means for calculating an actual value representative of a required amount of fuel to be actually sucked into each of the individual engine cylinders during the suction stroke thereof on the basis of the values derived by the third and fourth means; and
   (h) sixth means for producing and outputting the injection pulse signal to the fuel injector at the timing derived by the first means, the pulsewidth thereof corresponding to the actual value calculated by the fifth means.

5. The system according to claim 4, wherein second means includes:
   (a) means for detecting engine rotation speed; and
   (b) means for detecting engine load.

6. The system according to claim 4, wherein the fourth means calculates the amount of fuel distribution to each cylinder on the basis of the lengths of the respective branch passages from the position of the fuel injector to the corresponding cylinders, inner volume the branch passages, and influence of inertia due to air stream flowing through each branch passage.

7. The system according to claim 4, wherein the first means includes a sensor for detecting the engine revolution speed and wherein the first means determines the suction stroke of each cylinder on the basis of the engine revolution speed detected by the sensor.

8. The system according to claim 4, wherein the fuel injector is disposed upstream of a throttle valve located within the chamber of the intake manifold.

9. A method for injecting fuel into a chamber of an internal combustion engine connected to a plurality of piston cylinder intake ports by a plurality of branch passages having mutually unequal lengths, comprising the steps of:

(a) detecting and reading engine load and engine revolution speed;

(b) identifying one of the cylinders in a timing of suction stroke;

(c) setting a rate of fuel distribution to each cylinder on the basis of the detected and read engine load and engine revolution speed in step (a) and each dimension of the branch passages from a position of the fuel injector to each cylinder including each branch passage and reading the rate of fuel distribution for the corresponding one of the cylinders in the suction stroke identified in step (b);

(d) calculating a fuel injection pulsewidth for each cylinder on the basis of the rate of fuel distribution to each cylinder and engine load and engine revolution speed detected and read in step (a); and (e) actuating the fuel injector to inject fuel in each suction stroke of the respective cylinders identified in step (b) on the basis of the fuel injection pulsewidth calculated in step (d).

10. The fuel supply system of claim 1, wherein said second means operates to cause quantities of fuel to be discharged from said device for respective supply to each engine cylinder such that the individual quantities of fuel correspond to substantially identical said amounts of fuel respectively supplied to each said engine cylinder, said quantities of fuel from said device being individually determined and controlled.

* * * * *

UNITED STATES PATENT AND TRADEMARK OFFICE
CERTIFICATE OF CORRECTION

PATENT NO. : 4,782,806
DATED : November 8, 1988
INVENTOR(S) : Keiji Hatanaka

It is certified that error appears in the above-identified patent and that said Letters Patent is hereby corrected as shown below:

On the Title Page , under "[75] Inventor", change "Kenji" to --Keiji--

Signed and Sealed this

Sixteenth Day of May, 1989

Attest:

DONALD J. QUIGG

Attesting Officer

Commissioner of Patents and Trademarks